(12) United States Patent
Kawakami

(10) Patent No.: US 12,338,967 B2
(45) Date of Patent: Jun. 24, 2025

(54) LIGHTING TOOL FOR VEHICLE AND VEHICLE REARWARD ILLUMINATION SYSTEM

(71) Applicant: Stanley Electric Co., Ltd., Tokyo (JP)

(72) Inventor: Takuya Kawakami, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/837,607

(22) PCT Filed: Feb. 9, 2023

(86) PCT No.: PCT/JP2023/004404
§ 371 (c)(1),
(2) Date: Aug. 12, 2024

(87) PCT Pub. No.: WO2023/157757
PCT Pub. Date: Aug. 24, 2023

(65) Prior Publication Data
US 2025/0146641 A1 May 8, 2025

(30) Foreign Application Priority Data
Feb. 21, 2022 (JP) ................. 2022-024810

(51) Int. Cl.
*F21S 41/663* (2018.01)
*B60Q 1/22* (2006.01)
(Continued)

(52) U.S. Cl.
CPC .............. *F21S 41/663* (2018.01); *B60Q 1/22* (2013.01); *F21S 41/148* (2018.01); *F21S 41/24* (2018.01);
(Continued)

(58) Field of Classification Search
CPC ........ F21S 41/663; F21S 41/24; F21S 41/148; F21S 41/322; F21S 41/321; F21S 41/32;
(Continued)

(56) References Cited

U.S. PATENT DOCUMENTS 9,896,023 B1 * 2/2018 Salter ..................... F21S 43/255
2013/0272009 A1 10/2013 Fujiu et al.
(Continued)

FOREIGN PATENT DOCUMENTS

EP 2363738 A2 * 9/2011 ............. F21S 48/215
ES 2822024 A1 * 4/2021 ............... B60Q 1/22
(Continued)

OTHER PUBLICATIONS

International Search Report and Written Opinion mailed on Apr. 18, 2023, received for PCT Application No. PCT/JP2023/004404, filed on Feb. 9, 2023, 07 pages including English Translation.

*Primary Examiner* — Erin Kryukova
(74) *Attorney, Agent, or Firm* — XSENSUS LLP

(57) ABSTRACT

A lighting tool for a vehicle includes a first light emission unit that reflects first light emitted from a first light source using a reflector and emit the first light reflected by the reflector to a side behind a vehicle, and a second light emission unit configured to guide second light emitted from a second light source using a light guide lens and emit the second light guided by the light guide lens to a side behind the vehicle, the first light emission unit emits the first light toward the illumination range behind the vehicle, and the second light emission unit is disposed in plural in a vehicle width direction and selectively emits the second light for each of the illumination regions which are divided in the vehicle width direction so as to overlap the illumination range.

6 Claims, 8 Drawing Sheets

(51) Int. Cl.
*F21S 41/148* (2018.01)
*F21S 41/24* (2018.01)
*F21S 41/32* (2018.01)
*F21W 102/17* (2018.01)
*F21W 103/45* (2018.01)
*F21Y 115/10* (2016.01)
*H05B 47/125* (2020.01)

(52) U.S. Cl.
CPC ............ *F21S 41/32* (2018.01); *H05B 47/125* (2020.01); *F21W 2102/17* (2018.01); *F21W 2103/45* (2018.01); *F21Y 2115/10* (2016.08)

(58) Field of Classification Search
CPC ....... F21S 41/125; H05B 47/125; B60Q 1/22; B60Q 1/249; B60Q 1/247; F21Y 2115/10; F21Y 2105/10; F21Y 2105/12; F21Y 2105/14; F21Y 2105/16; F21Y 2105/18; F21W 2102/17; F21W 2103/45
See application file for complete search history.

(56) References Cited

U.S. PATENT DOCUMENTS

| | | | |
|---|---|---|---|
| 2017/0028905 A1* | 2/2017 | Irgang | B60Q 1/56 |
| 2021/0188155 A1* | 6/2021 | Massa | F21S 41/192 |
| 2021/0372584 A1* | 12/2021 | Tai | F21S 41/143 |

FOREIGN PATENT DOCUMENTS

| | | | | |
|---|---|---|---|---|
| JP | H08-290740 A | | 11/1996 | |
| JP | 2007-230505 A | | 9/2007 | |
| JP | 2013-166467 A | | 8/2013 | |
| JP | 2013-222553 A | | 10/2013 | |
| TW | 201736161 A | * | 10/2017 | ........... B60Q 1/0052 |

* cited by examiner

LIGHTING TOOL FOR VEHICLE AND VEHICLE REARWARD ILLUMINATION SYSTEM

CROSS-REFERENCE TO RELATED APPLICATIONS

The present application is based on PCT filing PCT/JP2023/004404, filed Feb. 9, 2023, which claims priority from Japanese Patent Application No. 2022-024810, filed Feb. 21, 2022, the entire contents of each are incorporated herein by reference.

TECHNICAL FIELD

The present invention relates to a lighting tool for a vehicle and a vehicle rearward illumination system.

BACKGROUND ART

For example, an obstacle behind a vehicle such as a pedestrian, a vehicle, or the like is detected when the vehicle moves rearward and a driver or pedestrian is alerted by illuminating the obstacle with light (for example, see the following Patent Document 1).

Specifically, the following Patent Document 1 discloses that an obstacle behind a vehicle is detected from an image captured by a camera, and an illumination range of light emitted rearward from the vehicle is variably controlled from near to far while rotating a shade using an actuator such as a motor or the like.

CITATION LIST

Patent Document

[Patent Document 1]
Japanese Unexamined Patent Application, First Publication No. 2013-166467

SUMMARY OF INVENTION

Technical Problem

However, in the lighting tool for a vehicle disclosed in the above-mentioned Patent Document 1, since the illumination range of the light emitted rearward from the vehicle is variably controlled by the shade, it is difficult to accurately illuminate a range where obstacles exist flexibly with strong light. For this reason, there is a risk that obstacles may not be found early and the driver may not be sufficiently alerted.

In addition, in the lighting tool for a vehicle disclosed in Patent Document 1, a mechanism configured to rotate the shade or the like has a large number of parts, resulting in a complex structure that increases costs.

An embodiment of the present invention is directed to providing a lighting tool for a vehicle capable of selectively emitting light toward an illumination region in which an obstacle is present, in an illumination range of light emitted rearward from a vehicle, when the vehicle moves rearward.

In addition, an embodiment of the present invention is directed to providing a vehicle rearward illumination system capable of finding an obstacle behind a vehicle early and alerting a driver by illuminating the obstacle behind the vehicle with strong light using such a lighting tool for a vehicle.

Solution to Problem

An aspect of the present invention provides the following configurations.

(1) A fighting tool for a vehicle including:
a first light emission unit that includes a first light source and a reflector, and that is configured to reflect first light emitted from the first light source using the reflector and emit the first light reflected by the reflector rearward from a vehicle; and
a second light emission unit that includes a second light source and a light guide lens, and that is configured to guide second light emitted from the second light source using the light guide lens and emit the second light guided by the light guide lens rearward from the vehicle,
wherein any one of light emission unit of the first light emission unit and the second light emission unit illuminates an illumination range behind the vehicle with any one of the first light and the second light, and
other one of the light emission unit of the first light emission unit and the second light emission unit is disposed in line in plural in a vehicle width direction and selectively illuminates illumination regions, which are divided in the vehicle width direction so as to overlap the illumination range, with the other light of the first light and the second light.

(2) The lighting tool for a vehicle according to the above-mentioned (1), wherein the one of the light emission unit is disposed in line in plural in the vehicle width direction and illuminates the illumination range with the one of the light.

(3) The lighting tool for a vehicle according to the above-mentioned (1) or (2), comprising a substrate on which the first light source and the second light source are mounted,
wherein the reflector is disposed at a side where the first light source is located with respect to the substrate, and
the light guide lens is disposed at a side where the second light source is located with respect to the substrate.

(4) The lighting tool for a vehicle according to any one of the above-mentioned (1) to (3), wherein the one of the light emission unit is the first light emission unit, and the other one of the light emission unit is the second light emission unit.

(5) A vehicle rearward illumination system configured to emit light rearward from a vehicle when the vehicle moves rearward, the vehicle rearward illumination system comprising:
the lighting tool for a vehicle according to any one of the above-mentioned (1) to (4);
a detection part configured to detect an obstacle behind the vehicle; and
a controller configured to control selective illumination of the illumination region where the obstacle is present with the other one of the light when the detection part detects the obstacle.

(6) The vehicle rearward illumination system according to the above-mentioned (5), wherein the detection part includes an imaging part configured to image an image behind the vehicle, and detects the obstacle on the basis of the image imaged by the imaging part.

Advantageous Effects of Invention

According to the aspect of the present invention, it is possible to provide a lighting tool for a vehicle capable of selectively emitting light toward an illumination range in which an obstacle is present, in an illumination region of light emitted rearward from a vehicle, when the vehicle moves rearward.

In addition, according to the aspect of the present invention, it is possible to provide a vehicle rearward illumination system capable of finding an obstacle behind a vehicle early and alerting a driver by illuminating the obstacle behind the vehicle with strong light using such a lighting tool for a vehicle.

DESCRIPTION OF EMBODIMENTS

Figure 1:
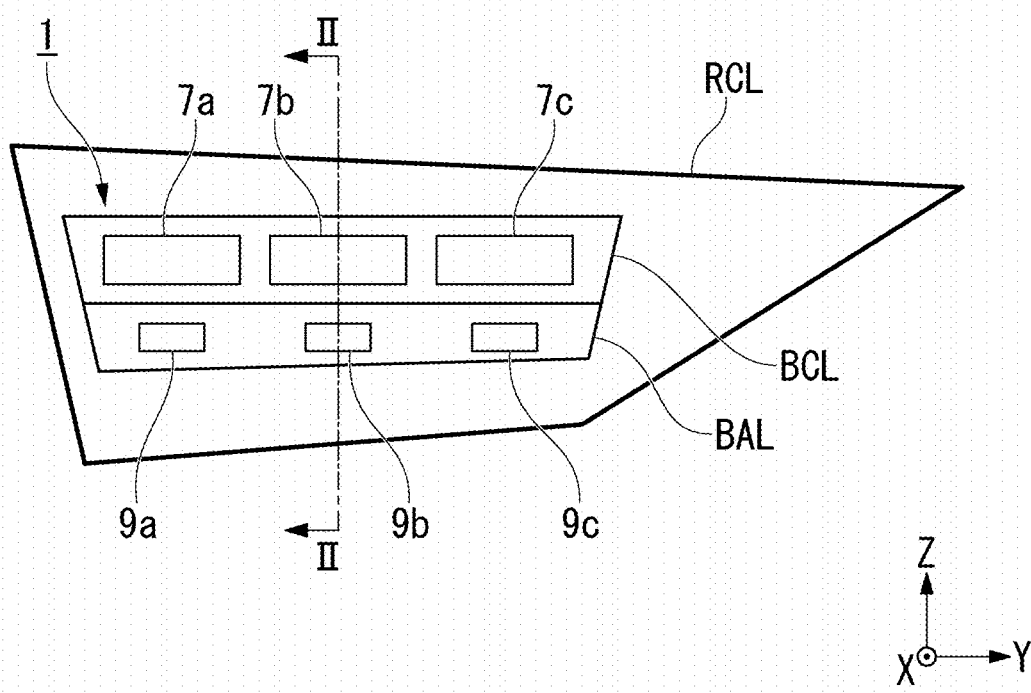
FIG. 1 is a front view showing a configuration of a lighting tool for a vehicle according to an embodiment of the present invention.

Hereinafter, an embodiment of the present invention will be described with reference to the accompanying drawings in detail.

Further, in the drawings used in the following description, in order to make it easier to see each component, dimensions may be shown at different scales depending on the component, and a dimensional ratio of each component may not be the same as the actual one.

Lighting Tool for Vehicle

First, as the embodiment of the present invention, for example, a lighting tool for a vehicle 1 shown in FIG. 1 and FIG. 2 will be described.

Further, FIG. 1 is a front view showing a configuration of the lighting tool for a vehicle 1. FIG. 2 is a cross-sectional view of the fighting tool for a vehicle 1 along line segment II-II shown in FIG. 1.

In addition, in the drawings as described below, an XYZ orthogonal coordinate system is set, an X-axis direction indicates a forward/rearward direction (lengthwise direction) of the lighting tool for a vehicle 1, a Y-axis direction indicates a leftward/rightward direction (widthwise direction) of the lighting tool for a vehicle 1, and a Z-axis direction indicates an upward/downward direction (height direction) of the lighting tool for a vehicle 1.

The lighting tool for a vehicle 1 of the embodiment is obtained by applying the present invention to, for example, a lighting tool for a vehicle including a back lamp BCL configured to emit white light when the vehicle moves rearward as one light emission unit and a back accessory lamp BAL configured to selectively emit white light when the vehicle moves rearward as the other light emission unit, in rear combination lamps RCL mounted on both corner portions on a rear end side of the vehicle (not shown) (in the embodiment, a corner portion on a left rear end side).

Further, the lighting tool for a vehicle 1 of the embodiment may have a configuration including the back lamp BCL and the back accessory lamp BAL obtained by applying the present invention to a lid lamp adjacent to the rear combination lamps RCL, in addition to the above-mentioned rear combination lamps RCL.

In addition, the rear combination lamps RCL are disposed laterally symmetrically on both the corner portion on the rear end side of the vehicle, and may be disposed not only in the rear combination lamps RCL on both left and right sides of the lighting tool for a vehicle 1 of the embodiment, but also in the rear combination lamp RCL on one side (a left or right side).

Further, in the following description, terms of "forward," "rearward," "leftward," "rightward," "upward" and "downward" refer to the respective directions when the lighting tool for a vehicle 1 is seen from the front (the back of the vehicle) unless the context indicates otherwise. Accordingly, directions when the vehicle is seen from the front (the front of the vehicle) are each opposite to the forward, rearward, leftward and rightward directions.

Figure 2:
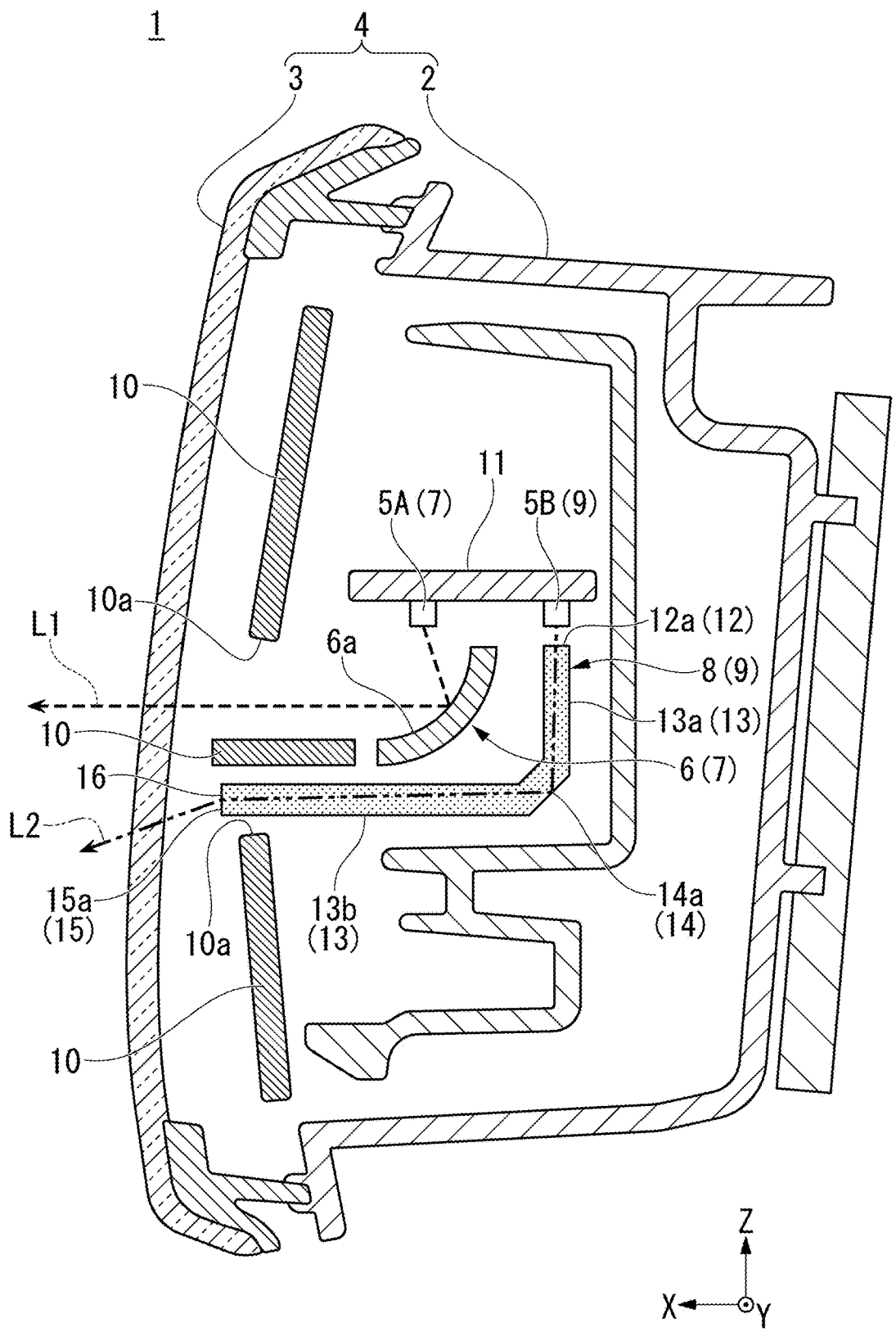
FIG. 2 is a cross-sectional view of the lighting tool for a vehicle along line segment II-II shown in FIG. 1.

As shown in FIG. 1 and FIG. 2, the lighting tool for a vehicle 1 of the embodiment includes a lighting body 4 constituted by a housing 2 having a front surface that is open, and a transparent outer lens 3 configured to cover the opening of the housing 2. Further, a shape of the lighting body 4 can be changed as appropriate according to a design or the like of the vehicle.

The lighting tool for a vehicle 1 of the embodiment includes a plurality of (in the embodiment, three) first light emission units 7 (distinguished as first light emission units 7a, 7b and 7c as appropriate) each including a first light source 5A and a reflector 6, a plurality of (in the embodiment, three) second light emission units 9 (distinguished as second light emission units 9a, 9b and 9c as appropriate) each including a second light source 5B and a light guide lens 8, and an extension 10, and these are disposed inside the lighting body 4.

The first light emission units 7 and the second light emission units 9 are arranged in line with a width direction of the vehicle (hereinafter referred to as "vehicle width direction").

The first light source 5A and the second light source 5B are constituted by, for example, light emitting diodes (LEDs) configured to emit white light. The first light source 5A and the second light source 5B are mounted on a circuit board 11, on which a driving circuit configured to drive each of the LEDs is provided.

Among these, the first light source 5A is mounted on the side of one surface (in the embodiment, a lower surface) of the circuit board 11. Accordingly, the first light source 5A radially emits downward light (hereinafter distinguished as "first light") L1.

In addition, the plurality of (in the embodiment, three) first light sources 5A are arranged in line in the vehicle width direction according to disposition of the plurality of first light emission units 7.

Meanwhile, the second light source 5B is mounted behind the first light source 5A on the one surface side of the circuit board 11. Accordingly, the second light source 5B radially emits downward light (hereinafter, distinguished as "second light") L2. In addition, the plurality of (in the embodiment, three) second light sources 5B are arranged in line in the vehicle width direction according to disposition of the plurality of second light emission units 9.

Further, in the embodiment, while the LEDs that constitute the first light source 5A and the second light source 5B and the driving circuit configured to drive the LEDs are mounted on the circuit board 11, the mounting substrate on which the LEDs are mounted and the circuit board on which the driving circuit configured to drive the LEDs is provided may be separately disposed, and the mounting substrate and the circuit board may be electrically connected via a wiring cord, which is referred to as a harness, thereby protecting the driving circuit from heat emitted from the LEDs.

The three reflectors 6 are arranged in line in the vehicle width direction to correspond to the three first light sources 5A mounted on the circuit board 11 at a lower position facing the first light source 5A with the circuit board 11 sandwiched therebetween.

The reflector 6 has, for example, a concave reflecting surface 6a that is parabola-based when viewed in a cross section, with the focus being the center (light emitting point) of the first light source 5A. For example, a reflecting member having light diffusivity such as a white glass epoxy resin or the like, or a reflecting member on which a reflecting film such as an aluminum vapor deposited film or the like is provided can be used in the reflector 6. In addition, a white reflecting member in which a reflecting film is provided on only the reflecting surface Ga may be used in the reflector 6.

Accordingly, each of the first light emission units 7 emits the first light L1 reflected by the reflecting surface 6a of the reflector 6 rearward from the vehicle while reflecting the first light L1 emitted from the first light source 5A using the reflecting surface 6a of the reflector 6.

Further, the reflector 6 may have a multi-reflector structure in which the reflecting surface 6a is divided into a plurality of reflection ranges. Accordingly, the reflector 6 can control a reflecting direction of the first light L1 entering each of the reflection ranges and reflect the first light L1 entering the reflecting surface 6a while diffusing the light L1 in the vehicle width direction.

The three light guide lenses 8 are arranged in line in the vehicle width direction to correspond to the three second light sources 5B mounted on the circuit board 11 at a lower side facing the second light source 5B while having the second light source 5B between the light guide lens 8 and the circuit board 11.

The light guide lens 8 is constituted by a light guide body configured to guide the second light L2 emitted from the second light source 5B as the inner lens, The light guide lens 8 can be made of a light-transmitting material formed of a material with a higher refractive index than air, such as a transparent resin such as polycarbonate or acryl, or glass.

The light guide lens 8 has an incidence part 12 disposed to face the second light source 5B configured to cause the second light L2 emitted from the second light source 5B to enter thereinto, a light guide part 13 configured to guide the second light L2 entering from the incidence part 12, a reflecting part 14 disposed on a side of the light guide part 13 facing the incidence part 12 and configured to reflect the second light L2 guided in the light guide part 13 toward a front surface side of the light guide part 13, and an emitting part 15 disposed on the front surface side of the light guide part 13 and configured to emit the second light L2 reflected by the reflecting part 14 to the outside.

The incidence part 12 has a flat (planar) incidence surface 12a on one end side (in the embodiment, an upper end side) of the light guide part 13. The second light L2 emitted from the second light source 5B enters the light guide part 13 from the incidence surface 12a (the incidence part 12) and is guided toward the other end side (in the embodiment, a lower end side) of the light guide part 13 while repeating reflection in the light guide part 13.

Further, the incidence part 12 is not limited to the configuration of the incidence surface 12a, and may cause the second light L2 radially emitted from the second light source 5B to enter the light guide part 13 while parallelizing and condensing the second light L2.

The light guide part 13 has a first portion 13a extending in the vehicle width direction and configured to guide the second light L2 downward between the incidence part 12 and the reflecting part 14, and a second portion 13b configured to guide the second light L2 forward between the reflecting part 14 and the emitting part 15. The first portion 13a is located behind the reflector 6. The second portion 13b is located below the reflector 6.

The reflecting part 14 has a reflecting surface 14a located between the first portion 13a and the second portion 13b of the light guide part 13 and inclined toward a front surface side of the light guide part 13 at a predetermined angle (in the embodiment, 45° with respect to an optical axis of the second light L2 guided in the light guide part 13). The second light L2 guided in the light guide part 13 is reflected by the reflecting surface 14a (the reflecting part 14) and guided toward the front surface side of the light guide part 13.

The emitting part 15 has an emitting surface 15a on the front surface side of the light guide part 13. In addition, a plurality of diffusion cuts 16 configured to diffuse the second light L2 emitted from the emitting surface 15a toward the outside (the side in front of the vehicle) are provided on the emitting surface 15a.

As the diffusion cuts 16, for example, a concavo-convex structure or the like formed by performing lens cutting referred to as flute cut or fish eye cut, knurling, embossing, or the like, can be exemplified. In the embodiment, as the diffusion cuts 16, the fish eye cut configured to diffuse the second light L2 emitted from the emitting surface 15a in the upward/downward direction and the leftward/rightward direction of the vehicle is provided.

The emitting part 15 emits the second light L2 entering the emitting surface 15a to the outside of the light guide part 13 (the light guide lens 8) while diffusing the second light L2 using the plurality of diffusion cuts 16.

Accordingly, each of the second light emission units 9 emits the second light L2 guided by the light guide lens 8 rearward from the vehicle while guiding the second light L2 emitted from the second light source 5B using the light guide lens 8.

The extension 10 is constituted by a colored (for example, black) light shielding member, has opening portions 10a corresponding to front surfaces of the first light emission units 7 and the second light emission units 9, and is disposed to cover surroundings of the opening portions 10a. The extension 10 blocks the first light L1 and the second light L2 emitted from other than the opening portions 10a by covering the surroundings of the opening portions 10a.

In the lighting tool for a vehicle 1 of the embodiment having the above-mentioned configuration, any one light emission unit (in the embodiment, the first light emission units 7) of the first light emission units 7 and the second light emission units 9 constitutes the back lamp BCL, and the other light emission unit (in the embodiment, the second light emission units 9) constitutes the back accessory lamp BAL.

The back lamp BCL can emit the first light L1, one of the lights, toward the illumination range behind the vehicle when vehicle moves rearward.

On the other hand, the back accessory lamp BAL can selectively emit the second light L2, the other one of the lights, for each of the illumination regions, which are divided in the vehicle width direction so as to overlap the illumination range of the back lamp BCL, when the vehicle moves rearward.

Vehicle Rearward Illumination System

Next, a vehicle rearward illumination system 100 using the lighting tool for a vehicle 1 shown in FIG. 3 will be described.

Figure 3:
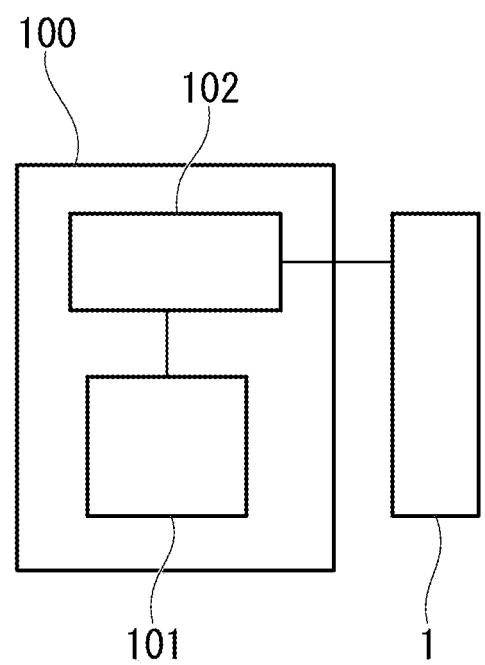
FIG. 3 is a block diagram showing a configuration of a vehicle rearward illumination system using the lighting tool for a vehicle shown in FIG. 1.

Further, FIG. 3 is a block diagram showing a configuration of the vehicle rearward illumination system 100.

As shown in FIG. 3, the vehicle rearward illumination system 100 of the embodiment includes the lighting tool for a vehicle 1, a detection part 101 configured to detect an obstacle behind the vehicle, and a controller 102 configured to control selective illumination of the second light L2 toward the illumination region in which the obstacle is present when the obstacle is detected by the detection part 101.

The detection part 101 includes an imaging part such as a back camera or the like mounted on a rear portion of the vehicle, and transmits data of an image G behind the vehicle to the controller 102 while imaging the image G. Further, the detection part 101 is not limited to the configuration including the above-mentioned imaging part and may have a configuration including a sensor configured to detect an obstacle behind the vehicle.

The controller 102 is constituted by a computer (ECU) mounted on the vehicle, receives the data of the image G transmitted from the detection part 101 and performs calculation of detecting the obstacle from the image G. In addition, the controller 102 outputs a control signal to the lighting tool for a vehicle 1 when the obstacle is detected.

Accordingly, the lighting tool for a vehicle 1 controls selective switching of lighting of the second light source 5B so as to emit the second light L2 toward the illumination region in which the obstacle is present among the illumination range of the first light L1 illuminated rearward from the vehicle.

An example of an operation of the vehicle rearward illumination system 100 having the above-mentioned configuration will be described with reference to FIG. 4A to FIG. 6B.

Figure 4A:
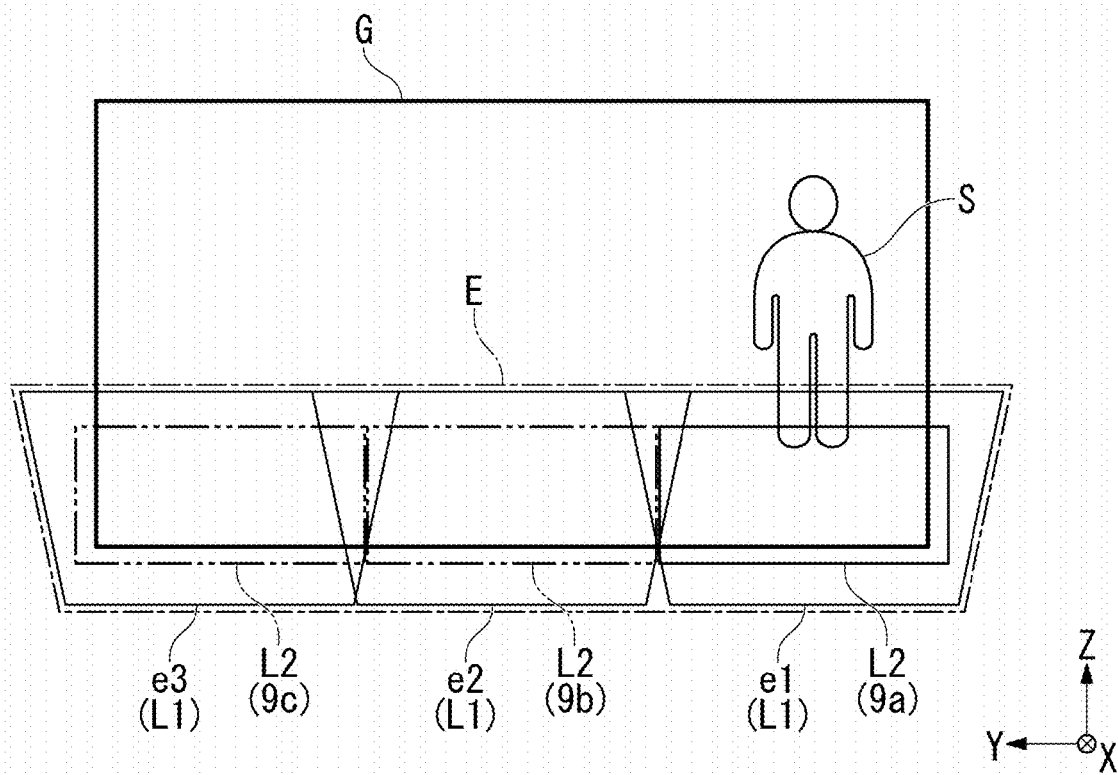
FIG. 4A is a view for describing an example of an operation of the vehicle rearward illumination system shown in FIG. 3 and a schematic diagram showing an image behind the vehicle.
Figure 4B:
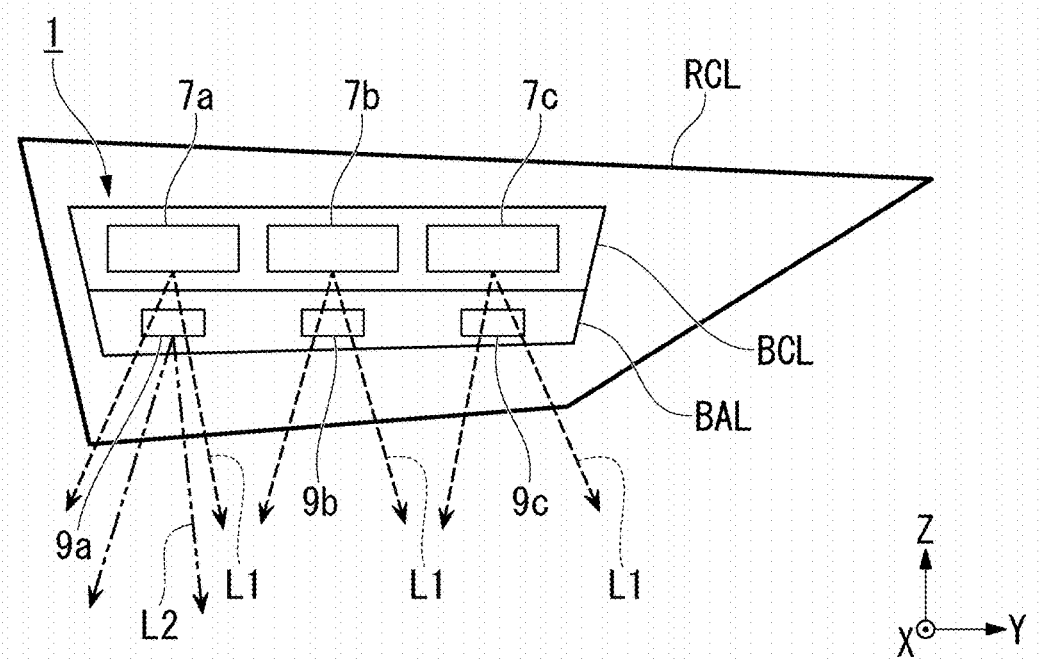
FIG. 4B is a view for describing an example of an operation of the vehicle rearward illumination system shown in FIG. 3 and a front view showing a lighting state of the lighting tool for a vehicle.
Figure 5A:
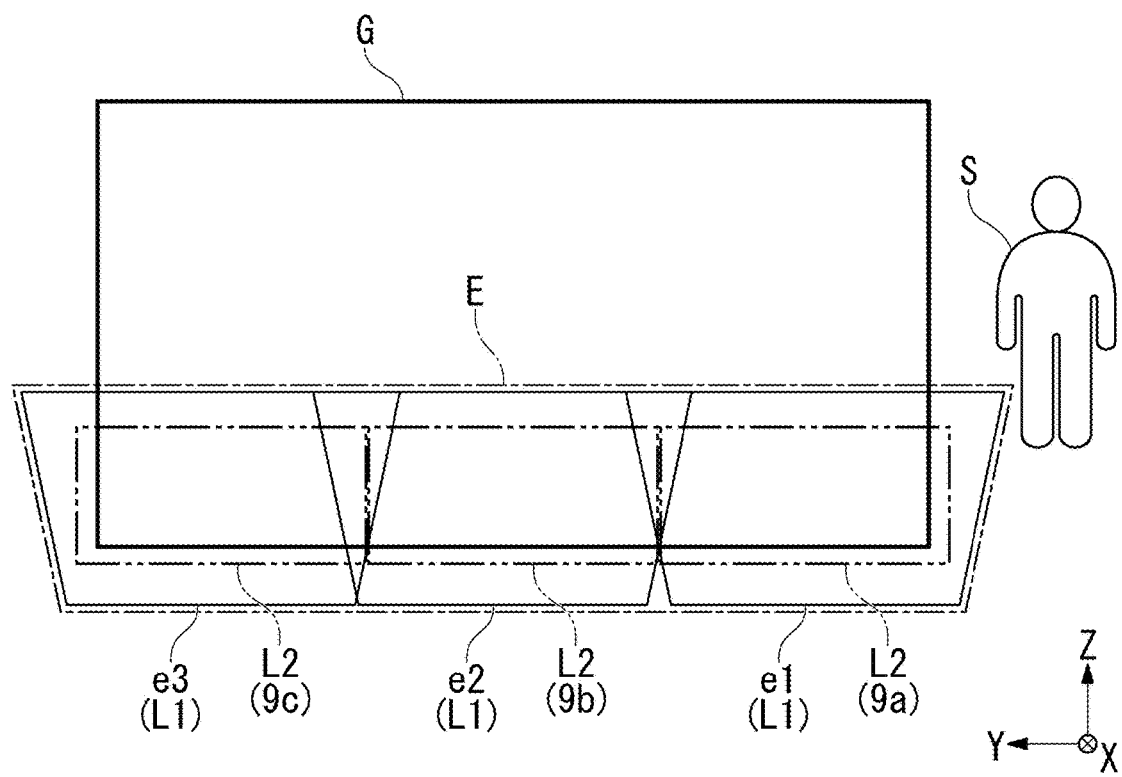
FIG. 5A is a view for describing an example of an operation of the vehicle rearward illumination system shown in FIG. 3 and a schematic diagram showing an image behind the vehicle.
Figure 5B:
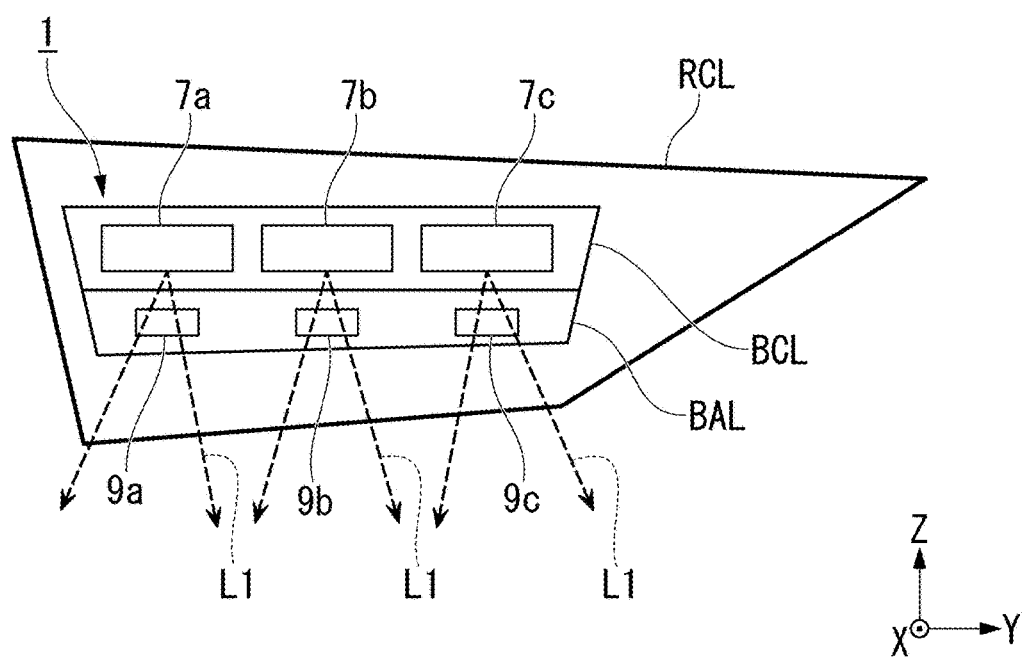
FIG. 5B is a view for describing an example of an operation of the vehicle rearward illumination system shown in FIG. 3 and a front view showing a lighting state of the lighting tool for a vehicle.
Figure 6A:
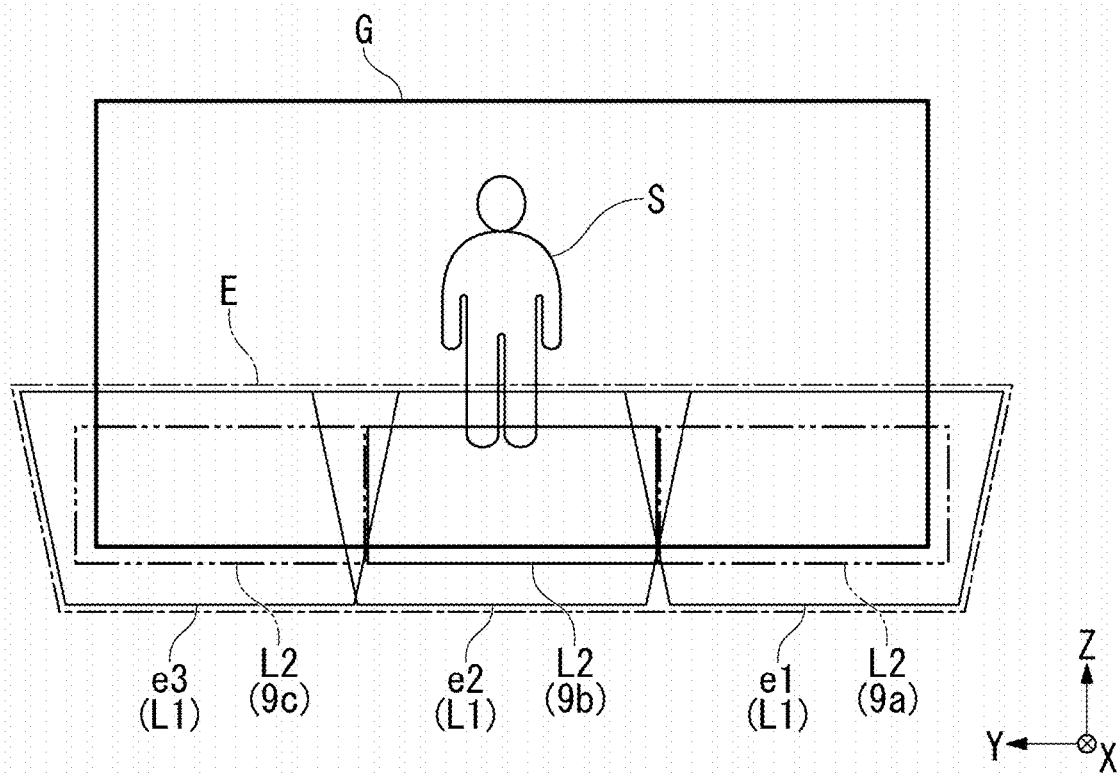
FIG. 6A is a view for describing an example of an operation of the vehicle rearward illumination system shown in FIG. 3 and a schematic diagram showing an image behind the vehicle.
Figure 6B:
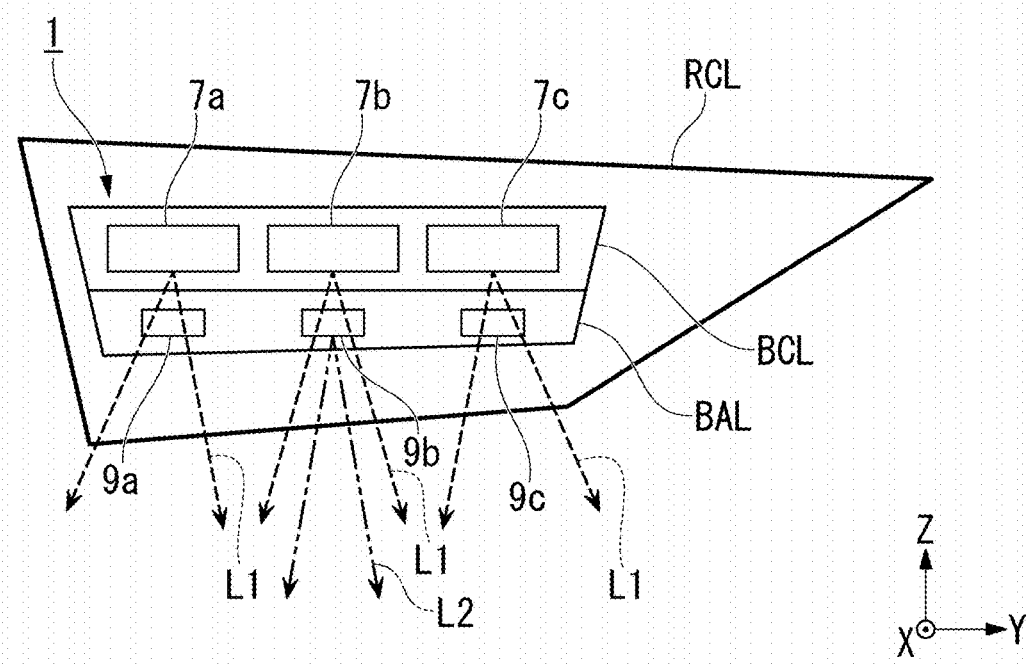
FIG. 6B is a view for describing an example of an operation of the vehicle rearward illumination system shown in FIG. 3 and a front view showing a lighting state of the lighting tool for a vehicle.

Further, FIG. 4A to FIG. 6B are views for describing examples of operations of the vehicle rearward illumination system 100, FIG. 4A, FIG. 5A and FIG. 6A are schematic diagrams showing the image G behind the vehicle, and FIG. 4B, FIG. 5B and FIG. 6B are front views showing a lighting state of the lighting tool for a vehicle 1.

In the vehicle rearward illumination system 100 of the embodiment, first, as shown in FIG. 4A and FIG. 4B, the plurality of back lamps BCL (the first light emission units 7a, 7b and 7c) emit the first light L1 toward an illumination range E behind the vehicle when the vehicle moves rearward.

Here, the first light L1 Illuminated from the plurality of back lamps BCL (the first light emission units 7a, 7b and 7c) forms one illumination range E behind the vehicle while overlapping the light in the vehicle width direction.

Further, the first light L1 illuminated from the plurality of back lamps BCL (the first light emission units 7a, 7b and 7c) may form one the illumination range E while overlapping each other in the illumination range E.

In the case shown in FIG. 4A and FIG. 4B, the second light source 5B of the back accessory lamp BAL (the second light emission units 9a) on the right side corresponding to an illumination region e1 on the right side where the obstacle (in the embodiment, a pedestrian) S is present, in three illumination regions e1, e2 and e3 divided in the vehicle width direction is turned on to overlap the illumination range E. Accordingly, the second light L2 is illuminated toward the illumination region e1 on the right side where the obstacle S is detected from the back accessory lamp BAL (the second light emission units 9a) on the right side.

In this case, the driver can quickly find the obstacle S behind the vehicle because the second light L2 is illuminated to the illumination region e1 where the obstacle S projected in the image G is present.

Next, as shown in FIG. 5A and FIG. 5B, when the obstacle S is moved to the outside of the illumination range E (in the embodiment, the right side), the second light source 5B of the back accessory lamp BAL (the second light emission units 9a) on the right side is turned off. Accordingly, only the first light L1 is illuminated toward the illumination range E behind the vehicle from the plurality of back lamps BCL (the first light emission units 7a, 7b and 7c).

Meanwhile, as shown in FIG. 6A and FIG. 6B, when the obstacle S is moved to an inner side of the illumination range E (in the embodiment, the left side), the second light source 5B of the above mentioned back accessory lamp BAL (the second light emission units 9b) on the left side is turned off, and the second light source 5B of the back accessory lamp BAL (the second light emission units 9b) on a center side corresponding to the illumination region e2 on a center side where the obstacle S is present is turned on. Accordingly, the second light L2 is illuminated toward the illumination region e2 on the center side where the obstacle S is detected from the back accessory lamp BAL (the second light emission units 9b) on the center side.

In this case, the driver can quickly find the obstacle S behind the vehicle because the second light L2 is illuminated to the illumination region e2 where the obstacle S projected in the image G is present.

Further, in the vehicle rearward illumination system 100 of the embodiment, it is possible to not only emit the second light L2 to only one of the illumination ranges e1, e2 and e3 where the obstacle S is present but also simultaneously emit the second light L2 to the plurality of illumination ranges e1, e2 and e3 where the obstacle S is present.

As described above, in the vehicle rearward illumination system 100 using the lighting tool for a vehicle 1 of the embodiment, it is possible to selectively emit the second light L2 toward the illumination ranges e1, e2 and e3 where the obstacle S is present, in the illumination range E of the first light L1 illuminated rearward from the vehicle when the vehicle moves rearward.

In addition, in the vehicle rearward illumination system 100 using the lighting tool for a vehicle 1 of the embodiment, it is possible to perform spot illumination of the second light L2 from the back accessory lamp BAL (the second light emission units 9) stronger than the first light L1 from the back lamp BCL (the first light emission units 7) to the obstacle S behind the vehicle. Accordingly, it is possible to find the obstacle S behind the vehicle early and alert the driver.

Further, the present invention is not necessarily limited to the above-mentioned embodiment, and various modifications may be made without departing from the scope of the present invention.

For example, in the lighting tool for a vehicle 1, while the first light emission units 7 constitute the back lamp BCL (one light emission unit) and the second light emission units 9 constitutes the back accessory lamp BAL (the other light emission unit), the second light emission units 9 may constitute the back lamp BCL (one light emission unit) and the first light emission units 7 may constitute the back accessory lamp BAL (the other light emission unit).

Figure 7:
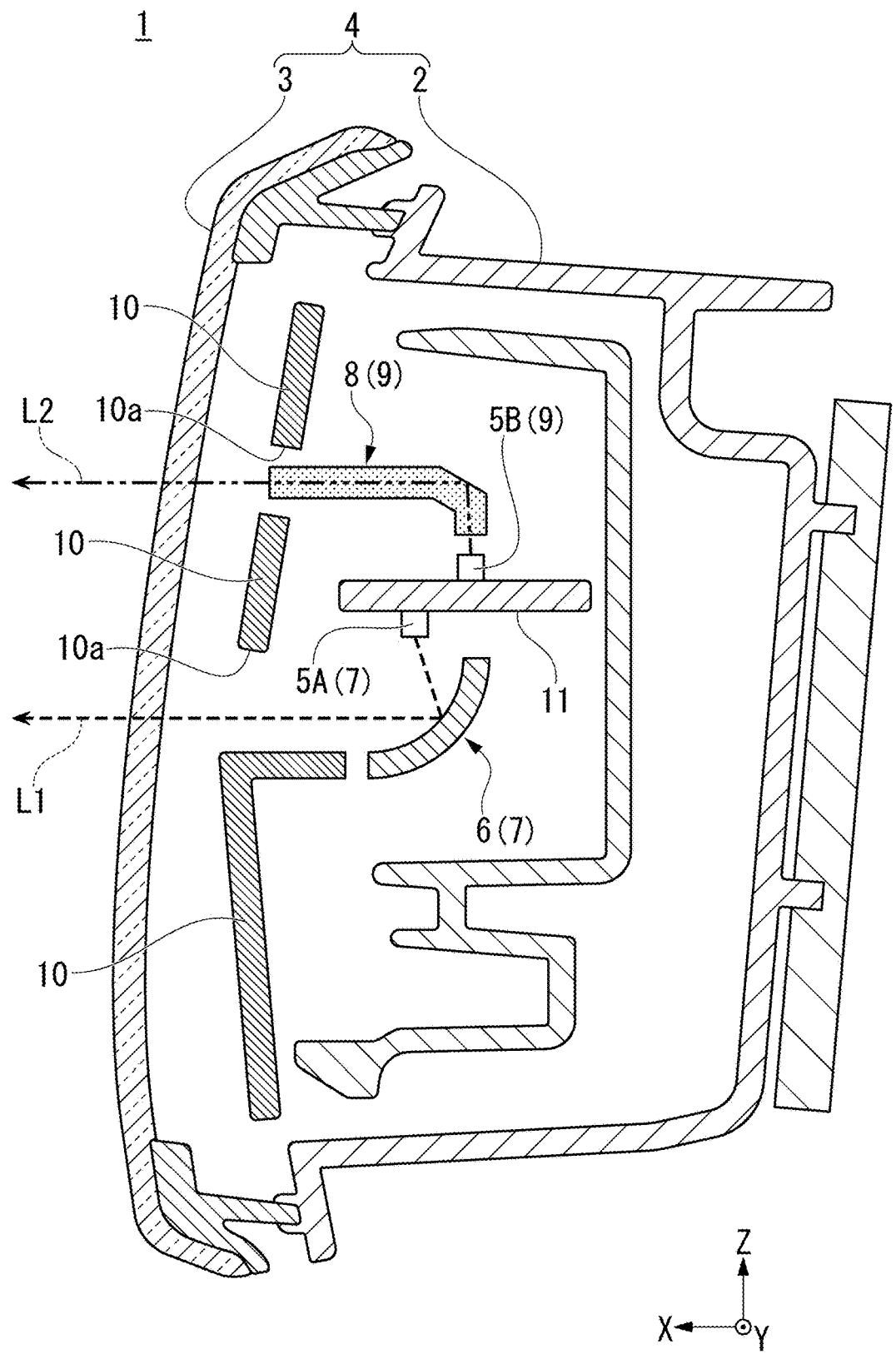
FIG. 7 is a cross-sectional view showing another configuration example of the lighting tool for a vehicle shown in FIG. 1.

In addition, in the lighting tool for a vehicle 1, while the first light emission units 7 are disposed on one side (in FIG. 2, a lower side) with respect to the circuit board 11 and the second light emission units 9 are disposed on one side (in FIG. 2, a lower side) with respect to the circuit board 11, for example, as shown in FIG. 7, the first light emission units 7 (the first light source 5A and the reflector 6) may be disposed on one side (in FIG. 7, a lower side) with respect to the circuit board 11 and the second light emission units 9 (the second light source 5B and the light guide lens 8) may be disposed on the other side (in FIG. 7, an upper side) with respect to the circuit board 11.

Figure 8:
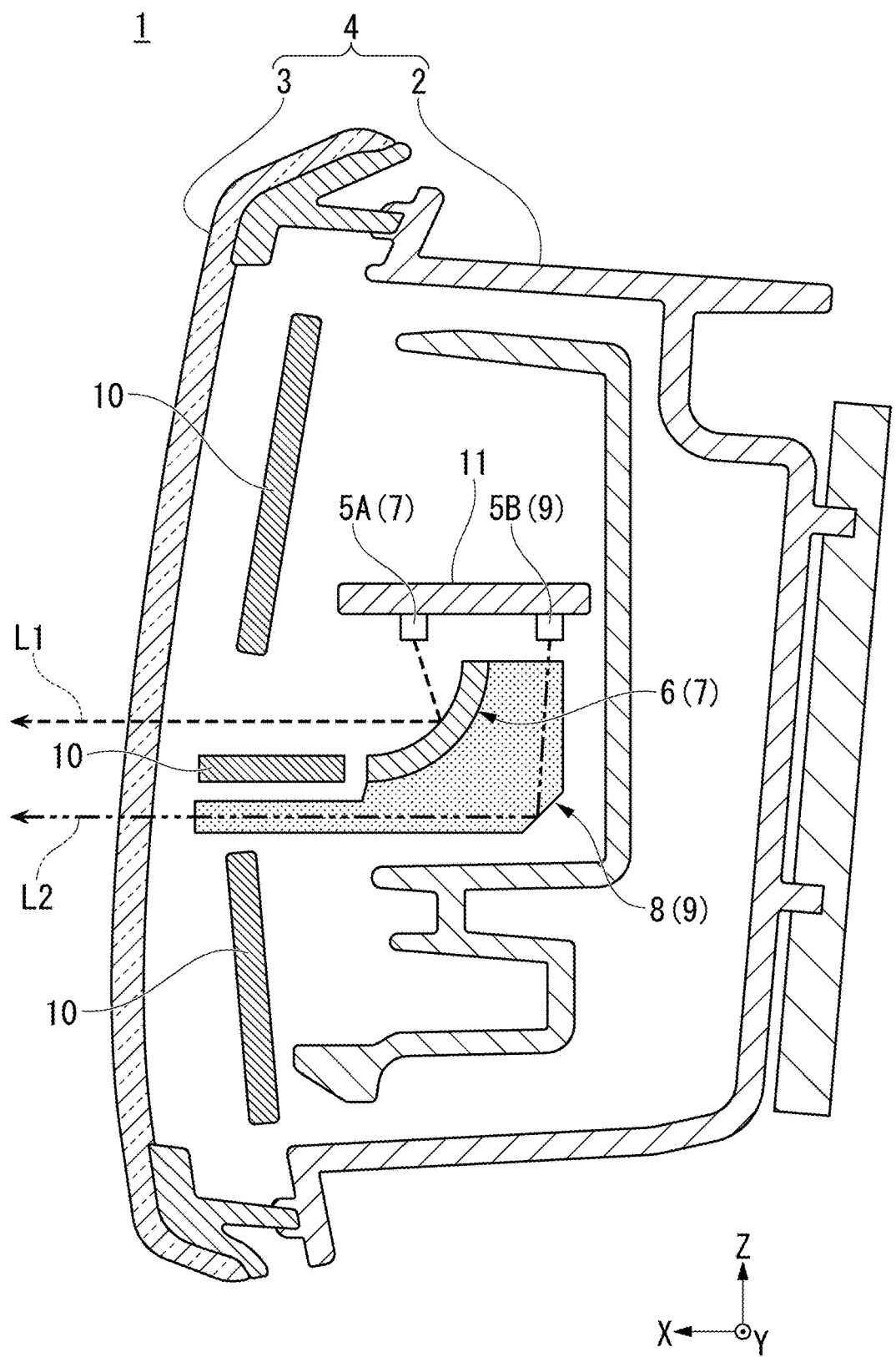
FIG. 8 is a cross-sectional view showing another configuration example of the lighting tool for a vehicle shown in FIG. 1.

Further, as shown in FIG. 8, it is also possible to provide a configuration in which the first light emission units 7 and the second light emission units 9 are integrated.

Further, when the lighting tool for a vehicle 1 of the embodiment is arranged to the rear combination lamps RCL on both the left and right sides, lighting of the plurality of back accessory lamps BAL disposed in the rear combination lamp RCL on the left side and the plurality of back accessory lamps BAL disposed in the rear combination lamp RCL on the right side can be controlled while synchronization, and the second light L2 can be selectively illuminated from the back accessory lamps BAL on both the left and right sides for each of the illumination ranges divided in the vehicle width direction so as to overlap the illumination range of the back lamp BCL.

Meanwhile, in the lighting tool for a vehicle 1 of the embodiment, it is also possible to independently control lighting of the plurality of back accessory lamps BAL disposed in the rear combination lamp RCL on the left side and the plurality of back accessory lamps BAL disposed in the rear combination lamp RCL on the right side, and selectively emit the second light L2 for each of the illumination ranges divided on left and right sides in the vehicle width direction so as to overlap the illumination range of the back lamp BCL.

Further, in the lighting tool for a vehicle 1 of the embodiment, when the obstacle S behind the vehicle is detected, in addition to emitting the second light L2 toward the illumination ranges e1, e2 and e3 where the obstacle S is present, the detection of the obstacle S behind the vehicle may be notified by voice or a warning light.

In addition, in a display part such as a back monitor or the like mounted in the vehicle, the image G imaged by the imaging part may be displayed. In this case, the driver can find the obstacle S behind the vehicle projected to the image G early while seeing the display part.

REFERENCE SIGNS LIST

1 . . . lighting tool for a vehicle 2 . . . housing 3 . . . outer lens 4 . . . lighting body 5A . . . first light source 5B . . . second light source 6 . . . reflector 7 . . . first light emission unit 8 . . . light guide lens 9 . . . second light emission unit 10 . . . extension 11 . . . circuit board 12 . . . incidence part 13 . . . light guide part 14 . . . reflecting part 15 . . . emitting part 16 . . . diffusion cut RCL . . . rear combination lamp BCL . . . back lamp BAL . . . back accessory lamp 100 . . . vehicle rearward illumination system 101 . . . detection part (imaging part) 102 . . . controller L1 . . . first light L2 . . . second light E . . . illumination range e1, e2, 3 . . . illumination region S . . . obstacle

The invention claimed is:

1. A lighting tool for a vehicle comprising:
a first light emission unit that includes a first light source and a reflector, and that is configured to reflect first light emitted from the first light source using the reflector and emit the first light reflected by the reflector rearward from a vehicle; and
a second light emission unit that includes a second light source and a light guide lens, and that is configured to guide second light emitted from the second light source using the light guide lens and emit the second light guided by the light guide lens rearward from the vehicle,
wherein any one of light emission unit of the first light emission unit and the second light emission unit illuminates an illumination range behind the vehicle with any one of the first light and the second light, and
other one of the light emission unit of the first light emission unit and the second light emission unit is disposed in plural in a vehicle width direction and selectively illuminates illumination regions, which are divided in the vehicle width direction so as to overlap the illumination range, with the other light of the first light and the second light.

2. The lighting tool for a vehicle according to claim 1, wherein the one of the light emission unit is disposed in plural in the vehicle width direction and illuminates the illumination range with the one of the light.

3. The lighting tool for a vehicle according to claim 1, comprising a substrate on which the first light source and the second light source are mounted,
wherein the reflector is disposed at a side where the first light source is located with respect to the substrate, and the light guide lens is disposed at a side where the second light source is located with respect to the substrate.

4. The lighting tool for a vehicle according to claim 1, wherein the one of the light emission unit is the first light emission unit, and the other one of the light emission unit is the second light emission unit.

5. A vehicle rearward illumination system configured to emit light rearward from a vehicle when the vehicle moves rearward, the vehicle rearward illumination system comprising:

the lighting tool for a vehicle according to claim 1;

a detection part configured to detect an obstacle behind the vehicle; and a controller configured to control selective illumination of the illumination region where the obstacle is present with the other one of the light when the detection part detects the obstacle.

6. The vehicle rearward illumination system according to claim 5, wherein the detection part includes an imaging part configured to image an image behind the vehicle, and detects the obstacle on the basis of the image imaged by the imaging part.

* * * * *